J. HERBY.
DUMP WAGON.
APPLICATION FILED MAY 10, 1915.
1,178,642.
Patented Apr. 11, 1916.
2 SHEETS—SHEET 1.
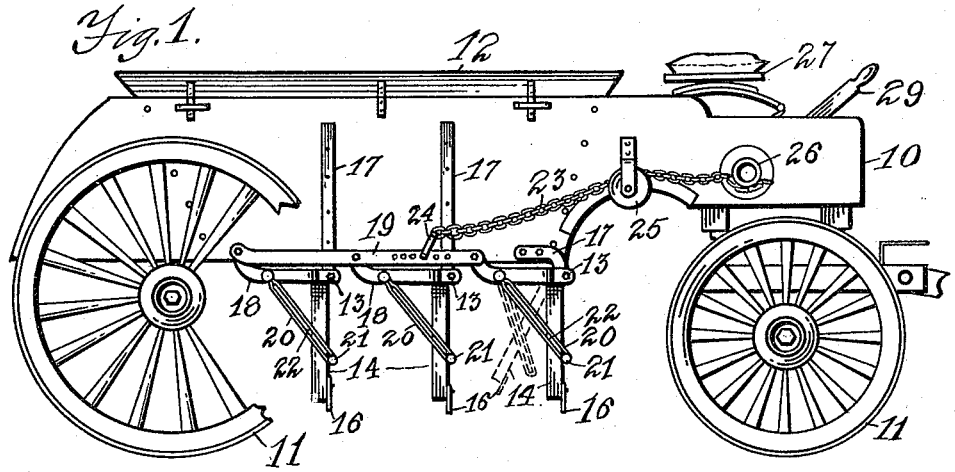
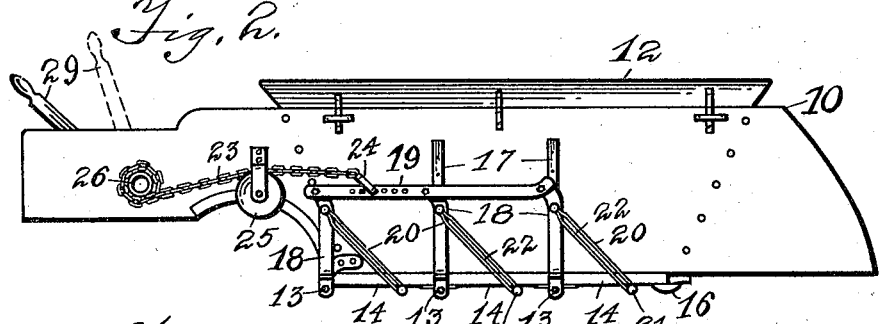
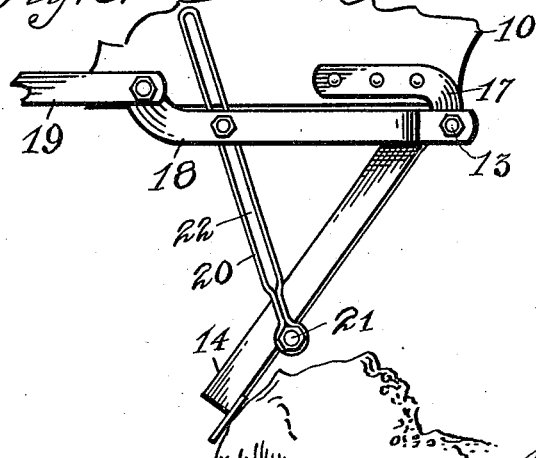
Witnesses
Harold Forsberg
H A Sandberg
Inventor
John Herby
By S. Arthur Baldwin
Attorney

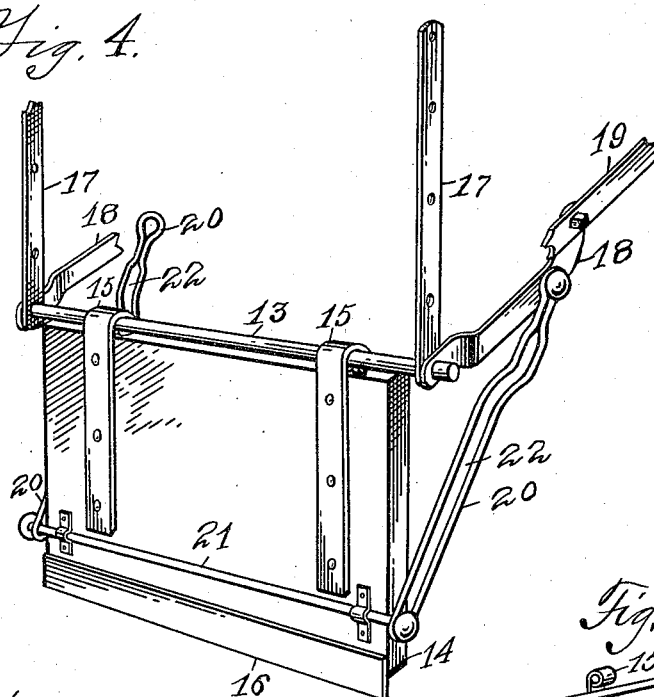
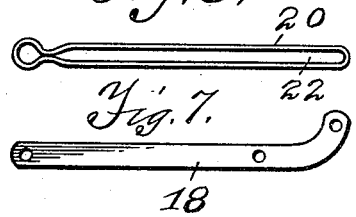
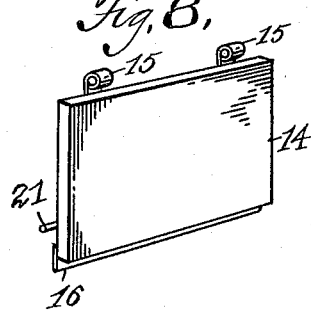
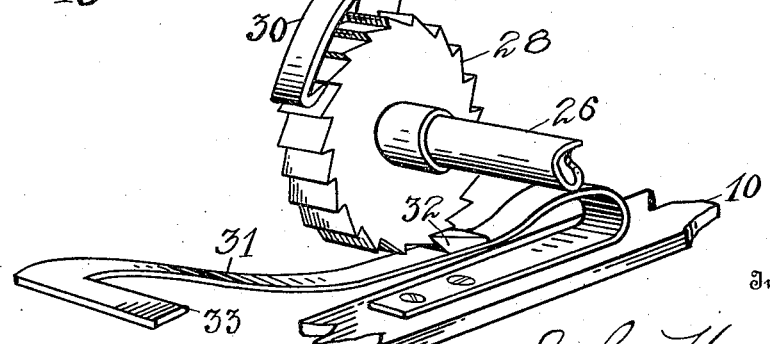

UNITED STATES PATENT OFFICE.

JOHN HERBY, OF JAMESTOWN, NEW YORK.

DUMP-WAGON.

1,178,642.   Specification of Letters Patent.   Patented Apr. 11, 1916.

Application filed May 10, 1915. Serial No. 26,986.

*To all whom it may concern:*

Be it known that I, JOHN HERBY, a citizen of the United States, residing at the city of Jamestown, in the county of Chautauqua and State of New York, have invented certain new and useful Improvements in Dump-Wagons, of which the following, taken in connection with the accompanying drawings, is a specification.

The invention relates to dump wagons; and the object of the improvement is to provide a wagon with dumping mechanism which swings freely and is not blocked or obstructed by the load of dirt after dumping and is strong and durable; and the invention consists in the novel features and combinations hereinafter set forth.

In the drawings, Figure 1 is a side elevation of the dump wagon immediately after dumping the load, and one of the swinging leaves or sections is shown in dotted line as it swings backward and drags over the dumped load. Fig. 2 is a side elevation of the opposite side of the box of the dump wagon with the swing leaves or sections in the closed position. Fig. 3 is a detail view of one of the swing leaves or sections showing a modification of the link connection of the leaf to the dumping lever. Fig. 4 is a perspective view of one of the swing leaves or sections showing the dumping levers and supporting straps as attached to the opposite sides of the box of the dumping wagon. Fig. 5 is a perspective view of the ratchet wheel and spring catch and lever for drawing up the swing leaves or sections. Fig. 6 is an elevation of one of the links; and Fig. 7 is an elevation of one of the dumping levers. Fig. 8 is a perspective view of one of the leaves or sections detached from the attaching cross rod on the bottom of the box.

Like numerals of reference refer to corresponding parts in the several views.

The numeral 10 designates the box of the dump wagon which is supported on the wheels 11. The rear portion 12 of the box is preferably made hopper shaped to receive the load. The box 10 may be low hanging or high as desired.

The dumping mechanism consists of a plurality of spaced cross rods 13 strongly attached across the underside of the box 10 by being inserted through the lower ends of the metal straps 17, which metal straps are attached to the opposite sides of the box 10, the first rod being preferably placed at the front of the hopper 12. The leaves or sections 14 are swingingly hinged to the rods 13 by means of strap hinges 15 attached to the under side of the leaves 14. A strip of metal 16, preferably steel, is strongly attached to the under side of the edge of the swing leaves or sections 14 and projects out beyond the edge of the leaf 14 so as to lap onto the rear edge of the next leaf when in the closed position, as shown in Fig. 2, thereby forming a close joint between the two leaves 14 when said leaves are closed.

A series of dumping levers 18 have one end pivotally attached on the opposite ends of the rods 13 and the other end to a connecting link or bar 19. Each of the levers 18 preferably bends down slightly from the point of pivotal attachment to the bar 19 so that the bar 19 and dumping levers 18 do not interfere with one another and are free to move pivotally down and up in dumping the load and in drawing up the leaves 14.

In order to draw up the leaves 14 from the open to the closed position and firmly hold them in said closed position so as to insure the firm closure of the joints between the leaves, links 20 are provided, one for each end of each leaf, which links are pivotally attached to the dumping levers at one end and to the ends of the leaves 14 at the other. For certain purposes they are preferably both slidably and pivotally attached to the leaf 14 by means of a suitable rod 21 attached on the underside of said leaf 14 near the edge thereof, the links 20 being formed with a long slot 22 therein for said slidable and pivotal attachment. For some purposes, however, it is preferable to change the link 20, end to end, pivotally attaching said link to the end of the leaf 14 and slidably attaching the link to the dumping lever 18 so that the links 20 slide upward alongside of the box 10, being confined to the dumping lever 18 by means of the attaching bolt or rivet.

To operate the leaves or sections 14 and the connecting links and levers 18, 19 and 20, a chain 23 is attached to the bar 19 by means of a clevis 24 so that it can draw freely at different angles upon the bar 19, changing its position as the bar is drawn upward. The chain 23 preferably passes over a pulley 25 so as to be out of the way of the front wheel 11 and is attached to the end of a shaft 26 to wrap around the same, said shaft 26 being preferably a metal pipe or tube revolubly mounted in and extending outside the sides of the box 10 beneath the driver's seat 27, the chain 23 being attached to the bars 19 at each side, as shown in Figs. 1 and 2, and wrapping around the opposite ends of the pipe shaft 26.

In order to draw the chain 23 around the pipe shaft 26, the end of the chain is attached to said pipe shaft and a ratchet wheel 28 is provided on said pipe shaft within the box 10 and a lever 29 is pivotally attached at its lower end to the pipe shaft 26 and has the hooked dog 30 hanging therefrom to engage the toothed periphery of the ratchet wheel 28, as shown in Fig. 5. A spring catch 31 is provided with a tooth 32 on its upper side and is attached to the bottom of the box 10 to engage the teeth of the ratchet wheel 28 yet permitting the tooth 32 to spring from tooth to tooth on said ratchet wheel as said wheel is turned by means of the dog 30 and lever 29. The spring 31 is preferably given a strong return bend so as to give plenty of room for the downward movement for the front portion of said spring, a foot rest 33 being provided on the front end of said spring 31 so that said spring may be pressed down thereby giving instant release to the ratchet wheel 28 when it is desired to dump the load.

It is obvious that the metal straps 17, dumping levers 18, bar 19 and links 20 may be cheaply and quickly forged or stamped thereby forming a very strong, durable and positive acting dumping mechanism which can be manufactured at low cost and in which the leaves 14 swing freely backward, permitting a dumped load to draw even against the underside of the box 10, since the leaves 14 may be pressed upward into the closed position by dragging over the pile where load after load are dumped in the same spot as, for example, in hauling sand.

I claim as new:

1. In a dumping wagon, a box, a bottom in said box composed of a series of hinged leaves, a series of dumping levers hinged to said box in line with said leaves, a bar connecting said dumping levers, and links connecting said dumping levers to said leaves to draw up and hold said leaves when said dumping levers are actuated, said links having slots to permit the free swinging of said leaves.

2. In a dumping wagon, a box, a bottom in said box composed of a series of crosswise hinged leaves, a corresponding series of dumping levers hinged to the sides of said box, a bar connecting said dumping levers, links pivotally attached at one end to said dumping levers and to the ends of said leaves at the other, said links having a take-up slot in one end to permit the free swinging of said leaves.

3. In a dumping wagon, a box, a bottom in said box composed of a series of crosswise spaced rods, a series of leaves hinged to said rods, a double series of dumping levers hinged one to each end of said crosswise rods, a bar at each side of said box connecting the upper ends of said dumping levers, slotted links pivotally attached one to each dumping lever and leaf end to draw up and hold said leaves when said dumping levers and bars are actuated and permit the free swinging of said leaves when released, and means for actuating said bars and leaves.

In testimony whereof I have affixed my signature in the presence of two witnesses.

JOHN X HERBY.
his mark

Witnesses:
H. A. SANDBERG,
HAROLD FORSBERG.

Copies of this patent may be obtained for five cents each, by addressing the "Commissioner of Patents, Washington, D. C."